United States Patent [19]

Savage et al.

[11] Patent Number: 5,575,602

[45] Date of Patent: Nov. 19, 1996

[54] MULTIPLE-ARMED NUT

[76] Inventors: Kevin J. Savage; Janet M. Savage, both of 1087 Green Glen Dr., Boothwyn, Pa. 19061

[21] Appl. No.: 516,339

[22] Filed: Aug. 17, 1995

[51] Int. Cl.⁶ ............................ F16B 39/282; B25B 23/08
[52] U.S. Cl. ...................... 411/405; 411/919; 81/176.15; 81/461
[58] Field of Search ................................ 411/405, 407, 411/410, 919; 81/176.1, 176.15, 176.2, 460, 461

[56] References Cited

U.S. PATENT DOCUMENTS

| | | | |
|---|---|---|---|
| 1,397,876 | 11/1921 | Meldal | 411/919 |
| 3,379,231 | 4/1968 | Gallo | 411/919 |
| 3,492,841 | 2/1970 | Ipri | 81/461 |
| 3,760,659 | 9/1973 | Campbell | 81/176.15 |

OTHER PUBLICATIONS

Popular Mechanics, Nov. 1947 Issue "Slotted Wrench for Wing Nuts".

*Primary Examiner*—Steven N. Meyers
*Assistant Examiner*—Robert G. Santos

[57] ABSTRACT

A nut device and corresponding tool of such shape to aid in the ease of removal from a threaded bolt, stud, or the like. The principal intended use of this invention is for fastening the wheels of a vehicle to the vehicle's axle, but could easily be applied to any threaded fastening system. The nut and subsequent tool fit together in such a manner that prevents slippage or dislodging of the tool from the nut while in operation. This problem is common for conventional hexagonal-type threaded fastener and tool systems that are typically used on wheels of vehicles.

4 Claims, 1 Drawing Sheet

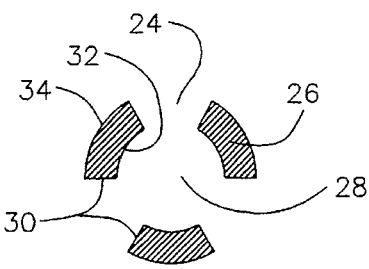
FIG 3
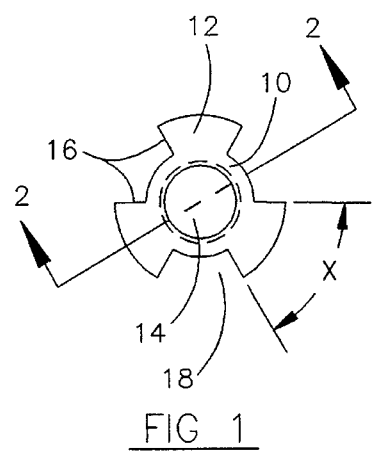
FIG 1
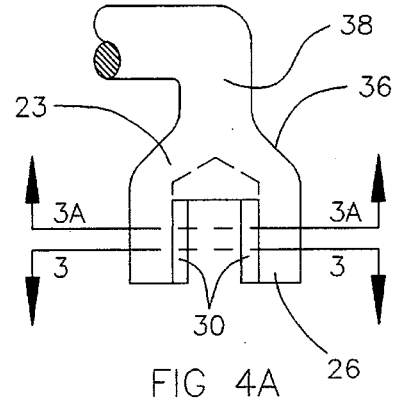
FIG 4A
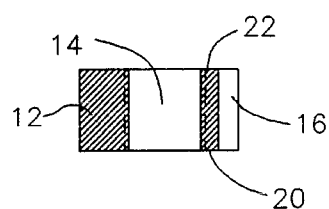
FIG 2
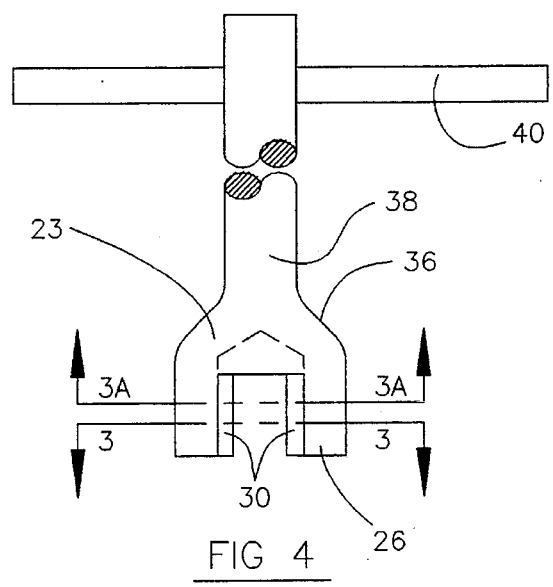
FIG 4
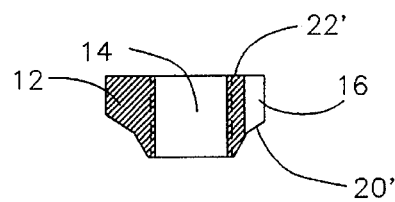
FIG 2A
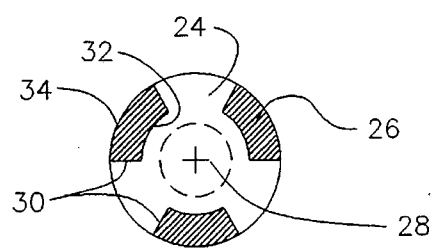
MULTIPLE-ARMED NUT & TOOL    FIG 3A

MULTIPLE-ARMED NUT

BACKGROUND—FIELD OF INVENTION

This invention relates to the fastening of vehicle tires to their respective wheel hubs, and in particular, the nuts that fit on the wheel hubs' threaded bolts.

BACKGROUND—DESCRIPTION OF PRIOR ART

General wheel fastening design consists of a plurality of threaded bolts projecting from the wheel hub, each a sufficient length to receive a nut which is tightened by a tool, such as a wrench. In the manner just briefly described, a wheel or tire is fastened to the wheel hub of an automobile or other type of vehicle.

Prior an relating specifically to the mounting and demounting of vehicle wheels, such as R. B. Temple's U.S. Pat. No. 1,940,617 dated Jan. 2, 1931, features a traditional hexagon nut. The outer edges of hexagonal nuts are subject to becoming rounded or stripped when a turning force is applied by a tool, such as a wrench. This will cause the applied wrench to slip away or dislodge, from the nut while turning the nut during mounting or dismounting of the wheel. When the tool consistently dislodges from the nut, manual mounting or dismounting a vehicle wheel becomes difficult and frustrating. C. S. Ash's U.S. Pat. No. 2,533,707 dated Dec. 12, 1950, and C. W. Sinclair's U.S. Pat. No. 2,482,378 dated Sep. 29, 1949, do not include or address in their prior art for mounting and removing of vehicle wheels, the particular shape of the threaded fastener, and its affect on one's ability to apply or remove the fastener. However, various devices have been developed in prior art to enhance a nut's turnability. A device along these lines is described by E. Meldel in U.S. Pat. No. 1,397,876 dated Nov. 22, 1921. The device of this prior art patent discloses a nut with radial arms or projections with parallel sides and these arms are built integral with a base. The base or rim of Meldel's prior art interferes with the tool's ability to achieve maximum contact surface with the nut. In addition, the nut's radial arms features parallel sides, which limit its ability to absorb maximum torsion or force from the applied tool. The parallel sides; or contact surfaces of the radial arms, are not oriented perpendicular to the applied force during operation. As a result, only a portion of the applied force is absorbed by the nut. Therefore the maximum efficiency of the operation cannot be achieved and dislodging between nut and tool is possible. M. Ginsburg describes in U.S. Pat. No. 4,467,481, dated Aug. 28, 1984, a nut similar to Meldel's, but indicates a nut being made of a resilient plastic material and with a collapsible cone-shaped nose specifically designed for easier hand turning. These features are detrimental in achieving greatest interlocking potential for the same reasons as stated for U.S. Pat. No. 1,397,876 and the plastic resilient material would not be able to withstand the forces involved in wheel mounting and dismounting.

Other devices have been developed in prior art featuring slotted tools and nuts. A device along these lines is described by I. Jackson in U.S. Pat. No. 811,925 dated Feb. 6, 1906. Jackson describes a thin-walled nut with notches or openings with edges inclined to the general plane of the head. The thin-walled nut and tool described would likely break or fail if subjected to the stresses and strains commonly applied to modern vehicle wheel nuts and related tools.

OBJECTS AND ADVANTAGES OF THE INVENTION

Accordingly, several objects and advantages of the presented invention are as follow:

a) to provide an improved manner of fastening a wheel to a vehicle's wheel hub.

b) to provide an improved manner of unfastening a wheel from a vehicle's wheel hub.

c) to provide a nut and tool assembly that nearly eliminates dislodging during application.

d) to maximize the transfer of applied force from the tool to the nut.

It is common for wheels to be fastened to a wheel hub using hexagon-shaped nuts which are fastened or applied with "powered" tools. Often, after a wheel has been fastened by this manner, or after rust or corrosion has occurred, increased friction between bolt and nut occurs. Either scenario often makes the manual removal of traditional hexagon nuts from their respective threaded bolts difficult. Often, while a person is struggling to remove such a nut, the hexagon-headed tool will slip off or become dislodged from the traditional hexagon-shaped tool. Typically, the hexagon-shaped nut is stripped of its exterior corners. As a result, the tire may not be removed by conventional manual efforts. The interlocking shape of the multiple-armed nut and tool will greatly reduce the incidence of dislodging between nut and tool. The multiple-armed nut and tool will also maximize the transfer of force from the tool to the nut.

The foregoing objects are achieved by the multiple-armed nut and tool. The multiple-armed nut provides greater contact area between nut and tool in the direction of applied force. The contact areas are located inside the nut and perpendicular to the direction of the applied force. The multiple-armed nut features a main circular body with the usual hollow threaded center. A plurality of arms extend from this main body (three are shown, but any number of arms is possible). These arms each have two flat surfaces between the main circular body and their outer rounded edges. These flat surfaces are constructed such that if the flat surfaces were extended inward they would intersect at the centerpoint of the multiple-armed nut. The tool is applied to the inner realm of the nut which effectively reduces incidences of slippage or dislodging. The main body of the nut may have a conical-shaped tapered nose to enhance a snug fit between wheel hub and wheel. The radial arms and main body are made of sufficient thickness to withstand externally applied stresses and strains.

The tool has a hollow center that can receive the shape of the multiple-armed nut. Built integral on the outer edges of the head is a plurality of teeth or protrusions equal to the plurality of the multiple-armed nut's radial arms. These teeth each have an outer and inner rounded or circular edge such that the circular outer edge aligns with the circular outer edge of the multiple-armed nut's radial arms. These teeth each also have an inner circular inner edge that aligns with the circular outer edge of the multiple-armed nut's main body. These teeth also feature two flat surfaces constructed similar to the flat surfaces of the multiple-armed nut's radial arms. The teeth's flat surfaces therefore contact the flat surfaces of the multiple-armed nut's radial arms when in operation. The tool is constructed of sufficient material and thickness to withstand externally applied stresses and strains. This snug fit between the nut's radial arms and the tool's teeth creates an interlocking pattern that greatly reduces incidence of dislodging while maximizing the transfer of force from the tool to the nut.

Maximum contact surface between nut and tool can be further achieved by constructing the teeth of the tool to be slightly longer or deeper than the flat surfaces of the nut's radial arms. The tool's teeth would then protrude slightly beyond the realm of the nut's arm further ensuring full contact between tool and nut during turning of the multiple-armed nut.

BRIEF DESCRIPTION OF THE DRAWINGS

FIG. 1 is a plan view of the multiple-armed nut

FIG. 2 is a side view of the multiple-armed nut

FIG. 2A is a side view of the multiple-armed nut

FIG. 3 is a plan view of the tool appearing as it would be directly applied to the nut FIG. 3A is a plan view of the tool's head as looking into the hollow center FIG. 4 is a side view of the tool with handles FIG. 4a is side view of the tool with a bent rigid body.

DETAILED DESCRIPTION OF THE INVENTION

In reference to FIG. 1, the shown multiple-armed nut consists of a circular main body (10). A circular main body (10) is integrally constructed with a plurality (three being shown) of radial projections or arms (12) and a threaded circular interior hole (14). Radial arms (12) each are constructed with a flat-surfaced face (16) between the outer rounded edge of each radial arm (12) and the outer rounded surface of the main body (10). A space (18) is located between each radial arm (12) to allow the teeth from a tool to fit between radial arms (12). Each arm's flat surfaces (16) relate to each other at an angle (x). FIG. 2 shows the multiple-armed nut from the side having a flat-shaped base (20) and a flat upper surface (22). FIG. 2A shows the multiple-armed nut from the side having a sloping conical shaped base (20') and a flat upper surface (22').

In reference to FIG. 4, shown tool consists of a head (23). FIG. 3 shows a sectional view of head (23) as it is applied to the multiple-armed nut. Head (23) features a plurality of indentations (24) (three are shown) which closely match radial arms (12). Head (23) has a plurality of teeth or projections (26) (three are shown) which closely match the created spaces (18) of the multiple-armed nut. Head (23) has a hollow center (28) to allow the main body (10) shape of the nut to fit into the interior of the tool. Teeth (26) each have two flat surfaces (30) that closely match in length and angle to flat surfaces (16) creating contact surfaces with the multiple-armed nut when in operation. Also, teeth (26) each have an interior curved surface (32) with a radius that closely matches main body (10) outer surface radius. Teeth (26) each have an exterior rounded surface (34) with a radius that closely matches radial arms (12) exterior rounded surface radius. FIG. 3A shows a sectional view of head (23) as it appears looking away from the multiple-armed nut during operation. One can see the shape of hollow center (28) closely matching the shape of the multiple-armed nut in FIG. 1. Again referring to FIG. 4, it shows a tool from the side or vertical position. Head (23) could be tapered (36) and built integrally with a solid main body (38) as shown with solid projecting arms or handles (40). Tool main body (38) could be constructed at any angle to suit any available space or application. In reference to FIG. 4A, if tool main body (38) is built at an angle then handles (40) may be omitted or modified to suit.

OPERATION OF INVENTION

The manner of operating or applying the multiple-armed nut would be by hand, applying threaded circular interior hole (14) to a threaded bolt, stud, or the like. Then inserting teeth (26) into spaces (18) in such a manner that flat surfaces (30) of teeth (26) contact flat surfaces (16) of radial arms (12). By applying force to handles (40) or applying force directly to tool main body (38), force is transferred through tool head (23), more specifically through teeth (26) that in turn creates contact between flat surfaces (30) of teeth (26) and flat surfaces (16) of radial arms (12). This contact results in a maximum transfer of force to radial arms (12) and integrally-built main body (10) such that threaded circular interior hole (14) turns around the previously mentioned bolt. The multiple-armed nut should be turned until flat base (20) or conical shaped base (20') contacts the object being fastened, such as the rim of a tire to the vehicle's hub. The multiple-armed nut may be removed by applying force to handles (40) or directly to tool main body (38) in the opposite direction.

SUMMARY

The reader will see that the threaded nut of this invention can be used to secure vehicle tires to their respective hub's threaded bolts. In addition, the nut of this invention can be removed with greater ease than conventional hexagon shaped nuts. The nut and accompanying tool achieves ease in removal by:

a) providing multiple contact surfaces between the nut and tool perpendicular to the direction of applied torsion or force b) providing interlocking contact surfaces between the nut and tool, which in turn prevents dislodging of tool from nut during the removal of the nut from a stud or bolt.

Although the description above provides several specifics, these should not be construed as limiting the scope of the inventions uses, but simply providing illustrations of some of the preferred embodiments of this invention. For example, the nut may have four arms, or the nut can be applied to any threaded fastener system such as common carpentry fasteners.

Therefore, the scope of the invention should be determined by the appended claims and their legal equivalents, rather than be governed by the provided examples.

What is claimed is:

1. A nut and mating tool head for mechanical fastening to a threaded stud, said nut being operable by said mating tool head, the nut comprising of:

a) a rigid circular main body with a threaded hollow center b) said main body built with a plurality of rigid radial arms extending therefrom each with rounded outer surfaces c) said radial arms each having unparallel rigid interior flat surfaces between the main body and said arm's rounded outer surface d) said unparallel rigid interior flat surfaces of each radial arm oriented at an angle that when projected, intersect at the center of the circular main body the mating tool head comprising of:

a) a plurality of teeth or projections matching in plurality the nut's radial projections b) a hollow center to allow a snug fit over the nut's main body c) said plurality of teeth each having circularly rounded interior and exterior surfaces
d) the plurality of teeth each having unparallel rigid flat surfaces between said rounded interior and exterior surfaces
e) said unparallel rigid flat surfaces of each tooth oriented at an angle that when projected, intersect at the center of said hollow center
f) the plurality of teeth built integrally with a rigid body.

2. The combination of claim 1 wherein the nut's main body includes a conical projection tapering to the diameter of the hollow center.

3. The combination of claim 1 wherein the tool's plurality of teeth is built integrally with a straight rigid body built integrally with a plurality of rigid handles.

4. The combination of claim 1 wherein the tool's plurality of teeth is built integrally with a rigid bent body.

* * * * *